(12) United States Patent
Kawaguchi

(10) Patent No.: US 11,140,297 B2
(45) Date of Patent: Oct. 5, 2021

(54) COMPUTER-READABLE MEDIUM, INFORMATION PROCESSING DEVICE, AND METHOD FOR CAUSING INFORMATION PROCESSING DEVICE TO DISPLAY IMAGE RESULTING FROM IMAGE SCANNING

(71) Applicant: BROTHER KOGYO KABUSHIKI KAISHA, Nagoya (JP)

(72) Inventor: Masafumi Kawaguchi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/032,181

(22) Filed: Sep. 25, 2020

(65) Prior Publication Data
US 2021/0099611 A1    Apr. 1, 2021

(30) Foreign Application Priority Data
Sep. 27, 2019    (JP) .............................. JP2019-177181

(51) Int. Cl.
*H04N 1/40*    (2006.01)
*H04N 1/00*    (2006.01)

(52) U.S. Cl.
CPC ....... *H04N 1/40012* (2013.01); *H04N 1/0044* (2013.01); *H04N 1/00474* (2013.01); *H04N 1/40062* (2013.01); *H04N 1/40093* (2013.01)

(58) Field of Classification Search
CPC ........... H04N 1/40012; H04N 1/40062; H04N 1/00474; H04N 1/0044; H04N 1/40093; H04N 1/62
See application file for complete search history.

(56) References Cited

U.S. PATENT DOCUMENTS

2009/0244653 A1* 10/2009 Hashimoto ........ H04N 1/00846
358/474

FOREIGN PATENT DOCUMENTS

JP    2016-095173 A    5/2016

\* cited by examiner

*Primary Examiner* — King Y Poon
*Assistant Examiner* — Michael Burleson
(74) *Attorney, Agent, or Firm* — Scully, Scott, Murphy & Presser, PC

(57) ABSTRACT

A non-transitory computer-readable medium stores computer-readable program instructions configured to, when executed, cause an information processing device to receive a scan instruction to cause an image scanner to perform image scanning of a document sheet, the scan instruction including a scan setting indicating whether to perform monochrome scanning or color scanning, receive image data generated by the image scanning of the document sheet according to the scan instruction, obtain base color information representing whether black is set as a base color in an OS of the information processing device, determine whether an image represented by the image data includes a text, and display the image in a black-white inverted manner, when the scan instruction includes the scan setting indicating to perform the monochrome scanning, the base color information represents that black is set as the base color, and it is determined that the image includes a text.

18 Claims, 8 Drawing Sheets

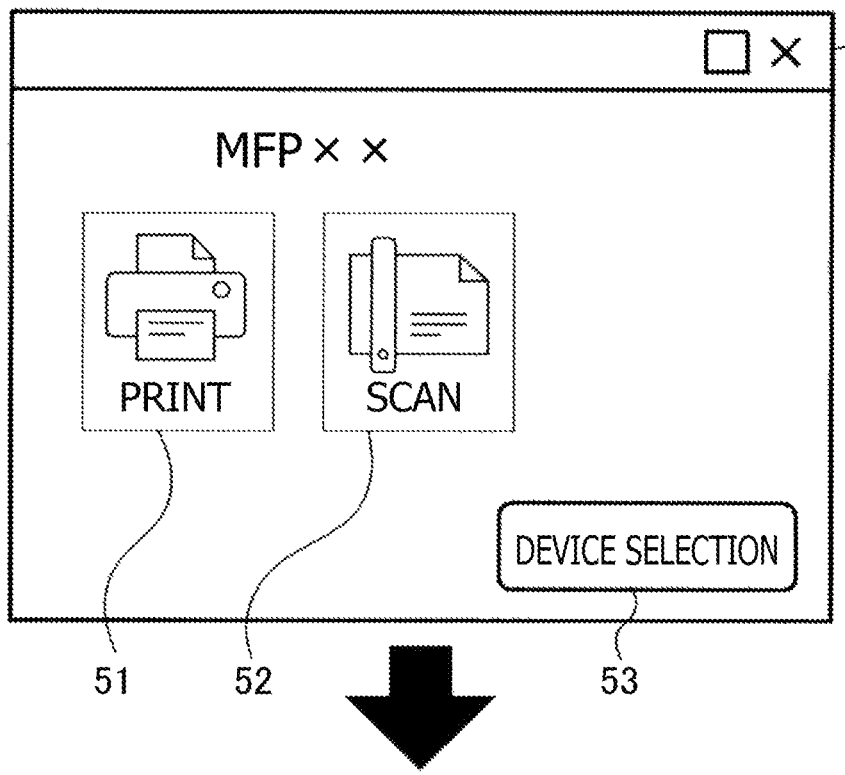
FIG. 2A
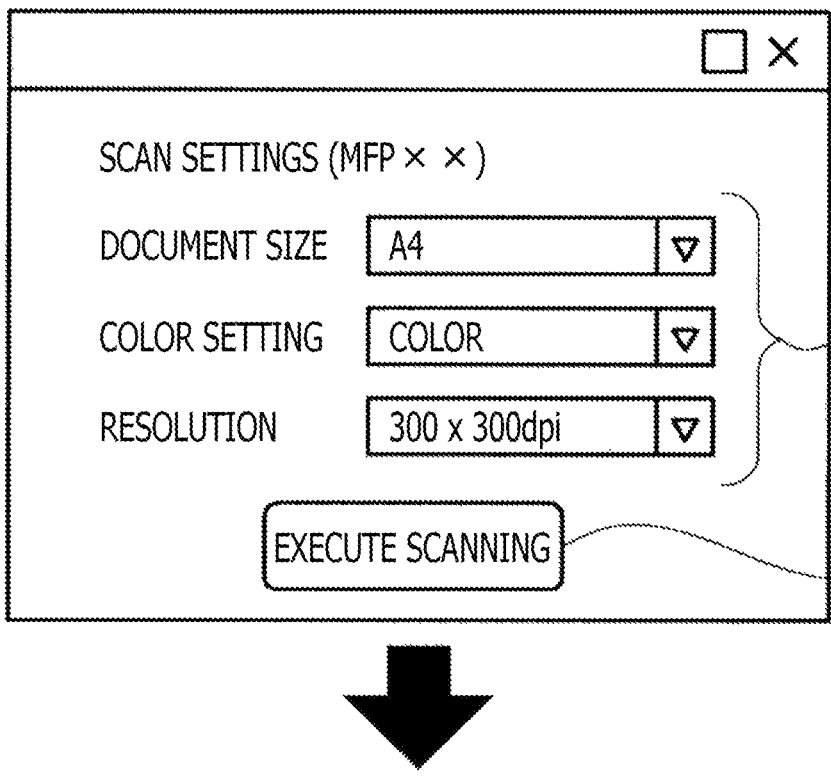
FIG. 2B
FIG. 2C

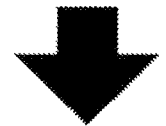
FIG. 2B
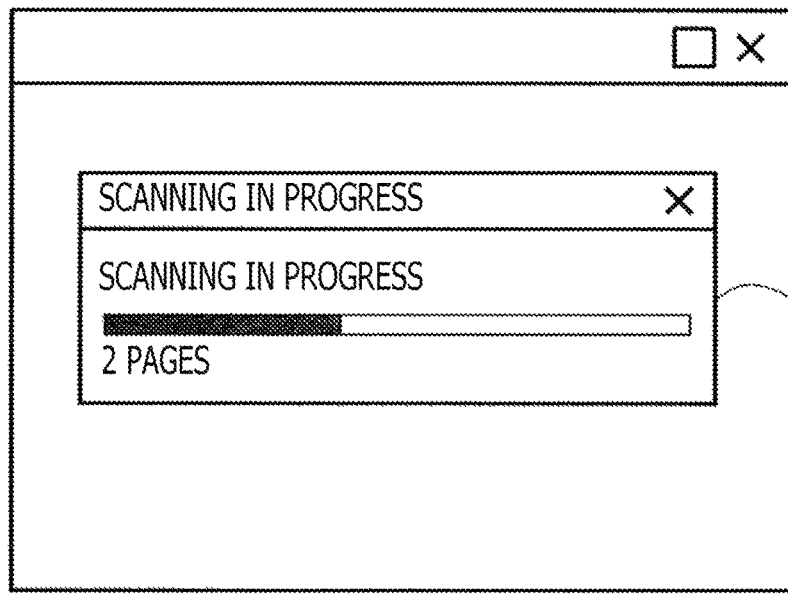
FIG. 2C
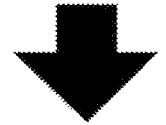
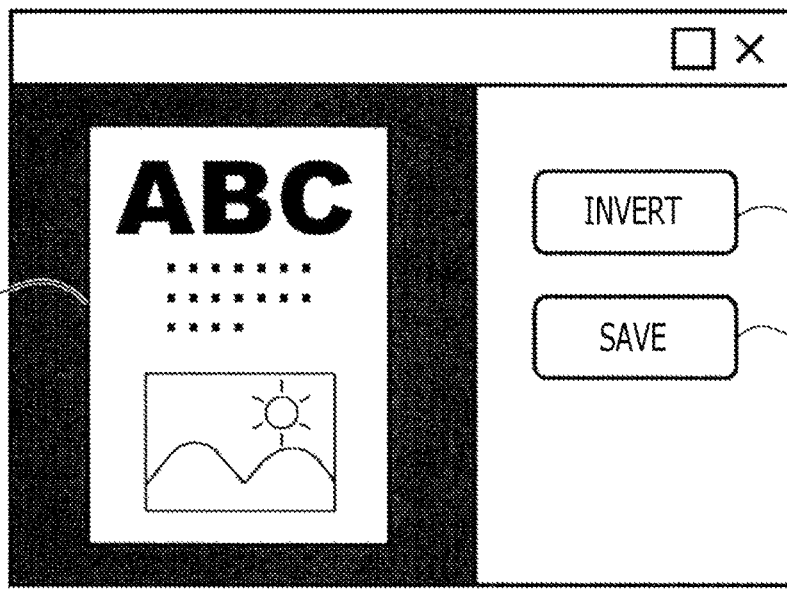
FIG. 2D

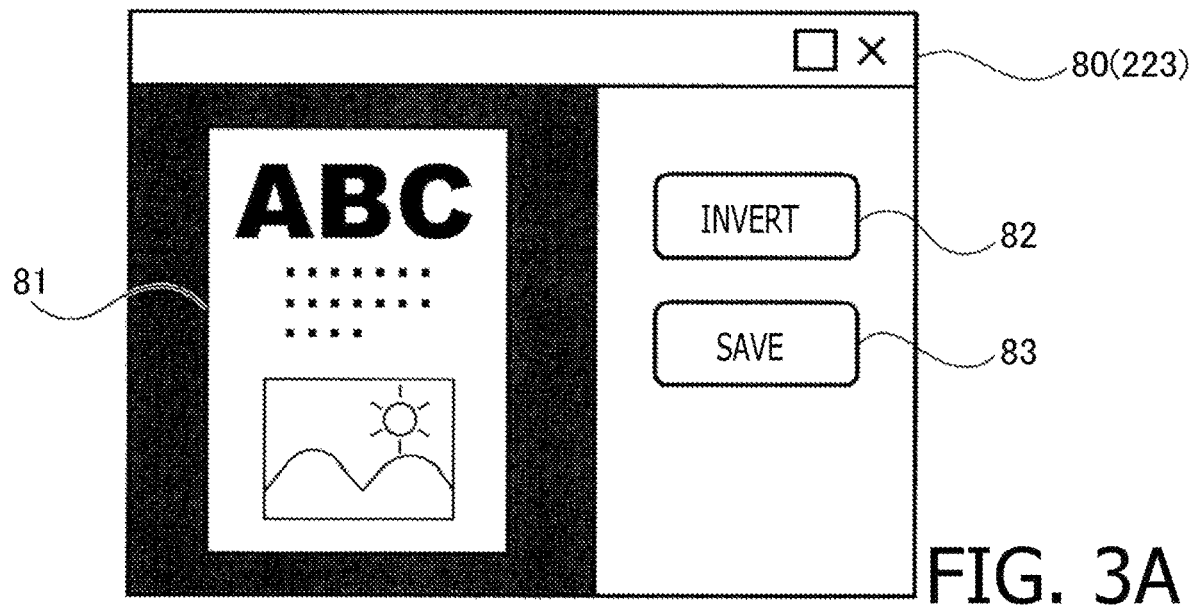
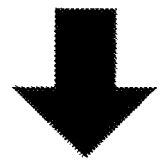
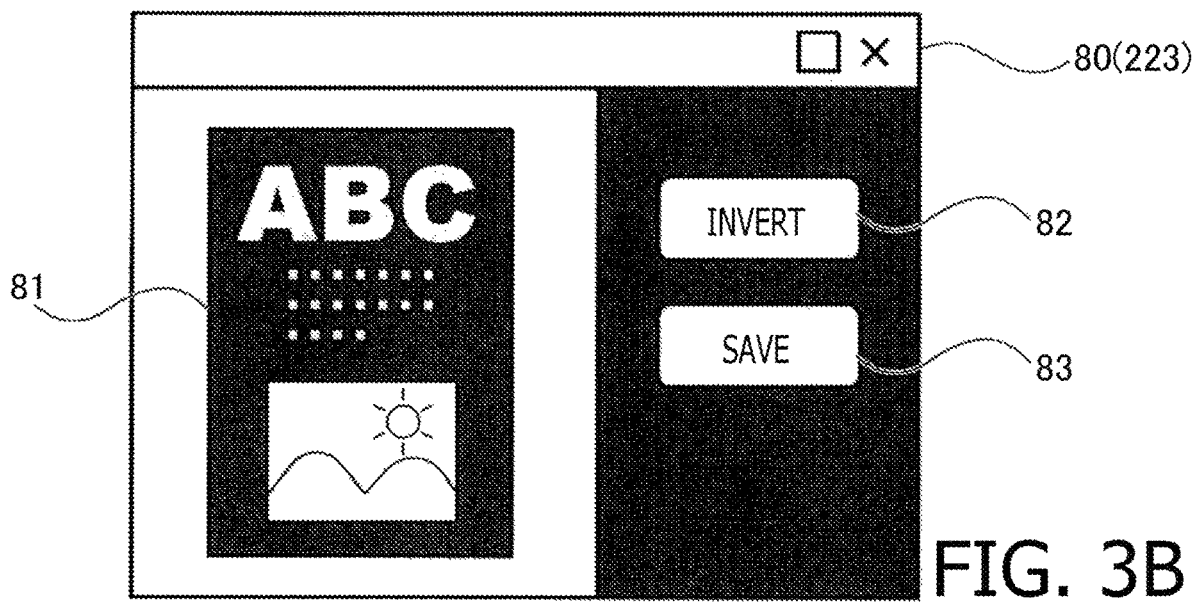

COMPUTER-READABLE MEDIUM, INFORMATION PROCESSING DEVICE, AND METHOD FOR CAUSING INFORMATION PROCESSING DEVICE TO DISPLAY IMAGE RESULTING FROM IMAGE SCANNING

CROSS-REFERENCE TO RELATED APPLICATION

This application claims priority under 35 U.S.C. § 119 from Japanese Patent Application No. 2019-177181 filed on Sep. 27, 2019. The entire subject matter of the application is incorporated herein by reference.

BACKGROUND

Technical Field

Aspects of the present disclosure are related to a non-transitory computer-readable medium, an information processing device, and a method for causing the information processing device to display an image resulting from image scanning by an image scanner.

Related Art

A technique has been known to change the color scheme for a menu and a background on a screen displayed with an application program, as a setting in an OS ("OS" is an abbreviation for "Operating System") incorporated in an information processing device, from a white-based color tone (e.g., a white mode or a light mode) to a black-based color tone (e.g., a black mode or a dark mode). For instance, selection of the black-based color tone is expected to more effectively reduce eye fatigue than the white-based color tone.

In the known technique, the dark mode is set when the ambient environment is dark, and the light mode is set when the ambient environment is bright. Further, a darker-tone guide image is displayed when the dark mode is set, and a brighter-tone guide image is displayed when the light mode is set.

SUMMARY

As an example of the known technique, an application program has been known that is configured to, when executed, cause an information processing device to display an image resulting from image scanning by an image scanner. The application program causes the information processing device to display the image represented by the scanned image data, regardless of a base color setting (a color mode setting) in the OS. Therefore, even though the black-based color tone is set in the OS, when a document sheet with a white background is scanned, the application program may cause the information processing device to display an image with a white background. Thus, in this case, sufficient effects of the setting of the black-based color tone are not achieved.

Aspects of the present disclosure are advantageous to provide one or more improved techniques for achieving sufficient effects of a base color setting in an OS of an information processing device even when an application program causes the information processing device to display an image resulting from image scanning by an image scanner.

According to aspects of the present disclosure, a non-transitory computer-readable medium is provided, which stores computer-readable program instructions executable by a processor of an information processing device communicable with an image scanner. The program instructions are configured to, when executed by the processor, cause the information processing device to receive a scan instruction to cause the image scanner to perform image scanning of a document sheet, via a user interface of the information processing device, the scan instruction including a scan setting indicating whether to perform monochrome scanning or color scanning, receive image data generated by the image scanning of the document sheet according to the scan instruction, from the image scanner via a communication interface of the information processing device, obtain base color information representing whether black is set as a base color in an OS incorporated in the information processing device, determine whether an image represented by the received image data includes a text, and apply black-white inversion to the image represented by the received image data, and display the black-white inverted image on a display of the information processing device, when the scan instruction includes the scan setting indicating to perform the monochrome scanning, the obtained base color information represents that black is set as the base color in the OS, and it is determined that the image represented by the received image data includes a text.

According to aspects of the present disclosure, further provided is an information processing device including a user interface, a communication interface, a display, and a controller. The controller is configured to receive via the user interface a scan instruction to cause an image scanner to perform image scanning of a document sheet, the scan instruction including a scan setting indicating whether to perform monochrome scanning or color scanning, receive image data generated by the image scanning of the document sheet according to the scan instruction, from the image scanner via the communication interface, obtain base color information representing whether black is set as a base color in an OS incorporated in the information processing device, determine whether an image represented by the received image data includes a text, and apply black-white inversion to the image represented by the received image data, and display the black-white inverted image on the display, when the scan instruction includes the scan setting indicating to perform the monochrome scanning, the obtained base color information represents that black is set as the base color in the OS, and it is determined that the image represented by the received image data includes a text.

According to aspects of the present disclosure, further provided is a method implementable on a processor of an information processing device communicable with an image scanner. The method includes receiving a scan instruction to cause the image scanner to perform image scanning of a document sheet, via a user interface of the information processing device, the scan instruction including a scan setting indicating whether to perform monochrome scanning or color scanning, receiving image data generated by the image scanning of the document sheet according to the scan instruction, from the image scanner via a communication interface of the information processing device, obtaining base color information representing whether black is set as a base color in an OS incorporated in the information processing device, determining whether an image represented by the received image data includes a text, and applying black-white inversion to the image represented by the received image data, and displaying the black-white inverted image on a display of the information processing device, when the scan instruction includes the scan setting indicating to perform the monochrome scanning, the obtained base color information represents that black is set as the base color in the OS, and it is determined that the image represented by the received image data includes a text.

BRIEF DESCRIPTION OF THE ACCOMPANYING DRAWINGS

FIGS. 2A to 2D show respective examples of a home screen, a scan setting screen, a scan execution screen, and a scan result display screen, which illustrate a transition of screens to be displayed when image scanning is performed with a scan application incorporated in the PC, in the illustrative embodiment according to one or more aspects of the present disclosure.

FIGS. 3A and 3B show respective examples of an image resulting from the image scanning, and an inverted image of the image resulting from the image scanning, which illustrate a change of the images displayed on the scan result display screen before and after black-white inversion, in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings. In the illustrative embodiment, a scanning system is disclosed that includes a multi-function peripheral (hereinafter referred to as an "MFP") and a personal computer (hereinafter referred to as a "PC") with a scanning program incorporated.

Figure 1:
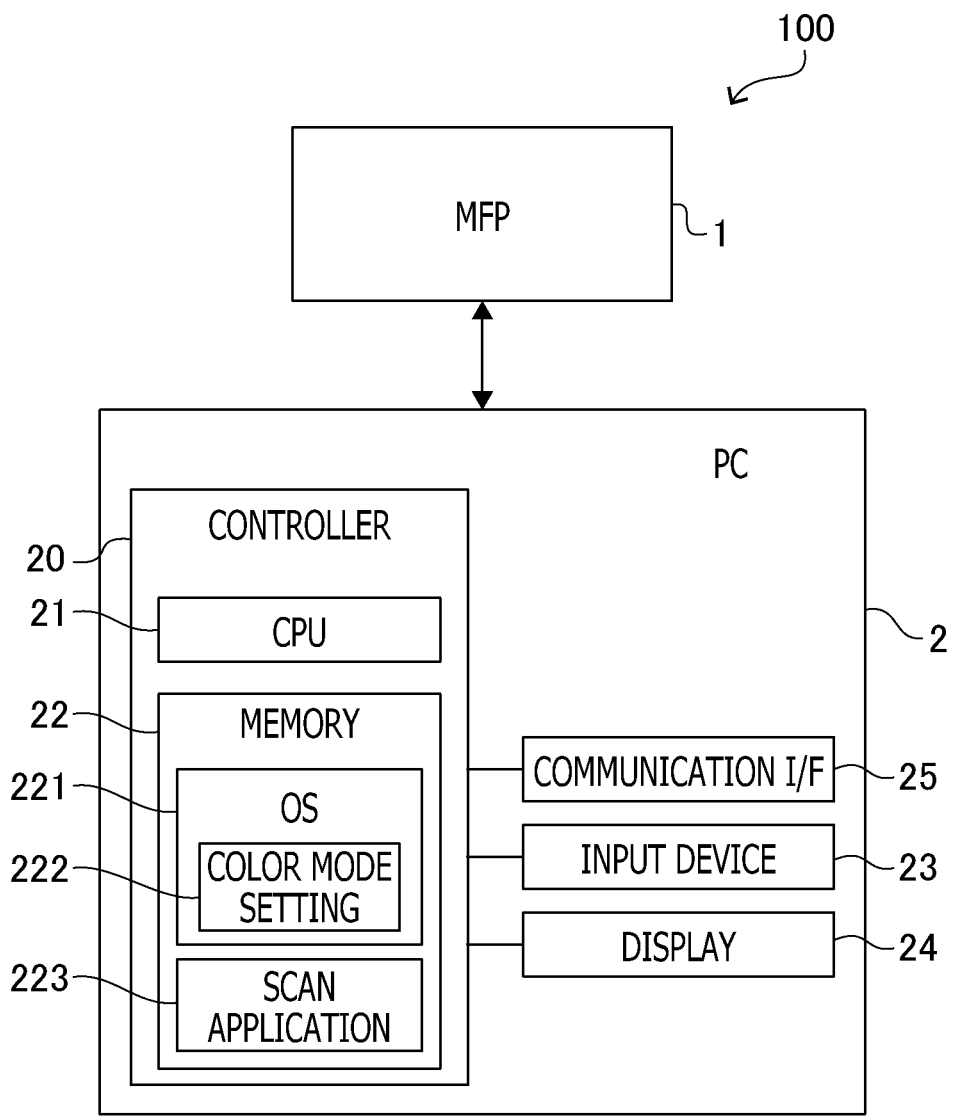
FIG. 1 is a block diagram showing an electrical configuration of a scanning system including a multi-function peripheral (hereinafter referred to as an "MFP") and a personal computer (hereinafter referred to as a "PC"), in an illustrative embodiment according to one or more aspects of the present disclosure.

As shown in FIG. 1, a scanning system 100 of the illustrative embodiment includes an MFP 1 and a PC 2 that are communicably connected with each other. Although FIG. 1 shows a single MFP 1 and a single PC 2, the scanning system 100 may include a plurality of MFPs 1 and a plurality of PCs 2. Further, the scanning system 100 may include one or more other devices.

The MFP 1 of the illustrative embodiment has a scanning function and a printing function. Further, the MFP 1 includes a communication I/F ("I/F" is an abbreviation for "interface") configured to communicate with one or more external devices such as the PC 2. Particularly, to achieve the scanning function, the MFP 1 is configured to scan an image of a document sheet and obtain image data of the scanned image. Specifically, the MFP 1 has two types of scanning modes, i.e., color scanning to scan a color document sheet and obtain color image data and monochrome scanning to obtain only monochrome image data. The MFP 1 may be a color image scanner configured to scan a color document sheet and obtain color image data, or may be a monochrome image scanner configured to obtain only monochrome image data.

The PC 2 of the illustrative embodiment includes a controller 20 that includes a CPU 21 and a memory 22. In addition, the PC 2 is connectable with the MFP 1. Further, the PC 2 includes an input device 23, a display device 24, and a communication I/F 25 that are electrically connected with the controller 20. It is noted that the "controller 20" is a generic name as which hardware and software used for controlling the PC 2 are collectively referred to, and may not necessarily represent a single hardware element actually existing in the PC 2.

The CPU 21 is configured to perform various processes according to programs read out from the memory 22 or based on user operations. The memory 22 is used, for instance, as a work area when the various processes are performed, or as a storage area to temporarily store data. Further, the memory 22 is used as an area to store various programs, various types of data such as image data, and various settings. For instance, the memory 22 stores an OS ("OS" is an abbreviation for "Operating System") 221 and a scan application 223. The scan application 223 is a program application for controlling an image scanner. Specifically, the scan application 223 is configured to, when executed by the CPU 21 of the PC 2, cause the PC 2 to receive a scan instruction directed to a specified image scanner (e.g., the MFP 1) and transmit the scan instruction to the specified image scanner. Further, the scan application 223 is configured to, when executed, cause the PC 2 to display an image represented by scanned image data generated by the image scanner.

The input device 23 is configured to receive input operations by a user. For instance, the input device 23 may include a keyboard and a mouse. The display device 24 is configured to display various kinds of information. For instance, the display device 24 may include a liquid crystal monitor. Furthermore, the input device 23 and the display device 24 may be configured to serve as a touch panel having both a display function and an input function.

The communication I/F 25 includes hardware for communicating with external devices such as the MFP 1. The communication method of the communication I/F 25 may be a wireless method or a wired method, and may be compliant with any communication standard such as Wi-Fi (registered trademark), Bluetooth (registered trademark), USB, or LAN, in the same manner as the MFP 1.

Subsequently, a scanning procedure by the scan application 223 will be described with reference to FIGS. 2A to 2D. It is noted the following description is based on an assumption that in the scan application 223, the MFP 1 is previously selected and registered as an image scanner and a printer to be used.

When launched, the scan application 223 causes the PC 2 to display a home screen 50 as shown in FIG. 2A on the display 24. The home screen 50 includes thereon a name of the selected MFP 1, a print button 51, a scan button 52, and a device selection button 53. The print button 51 is a button for instructing the MFP 1 to perform printing. Details about printing are omitted. The scan button 52 is a button for instructing the MFP 1 to perform image scanning. The device selection button 53 is a button for changing the selected device. Details about selection of the device selection are omitted. It is noted that hereinafter, "the scan application 223, when executed by the CPU 21, causes the PC 2 to perform a process" may simply be described as "the scan application 223 performs a process." Specifically, for instance, "the scan application 223, when executed by the CPU 21, causes the PC 2 to display the home screen 50 (see FIG. 2A) on the display 24" may simply be described as "the scan application 223 displays the home screen 50 on the display 24."

When the read button 52 is operated, the scan application 223 displays a scan setting screen 60 as shown in FIG. 2B on the display 24. The scan setting screen 60 includes scan setting item fields 61 for receiving scan settings, and a scan execution button 62. For instance, the scan setting items settable in the scan setting item fields 61 may include, but are not limited to, a document size, a color setting, and a resolution. As the color setting, one of "color" and "monochrome" is selectable. Namely, the color setting is a setting for specifying which of color scanning and monochrome scanning is to be performed by the MFP 1. Further, for instance, the scan setting items settable in the scan setting item fields 61 may further include a setting of double-sided scanning. In addition, the scan setting items settable in the scan setting item field 61 may be changed according to the capabilities of the selected scanner. The scan execution button 62 is a button for inputting a scanning start instruction.

When the scan execution button 62 is operated, the scan application 223 accepts a scan job as set in the scan setting item fields 61 and inputs the scan job into the OS 221. The PC 2 transmits the scan job input into the OS 221 to the MFP 1. When receiving the scan job, the MFP 1 starts scanning set document sheets. It is noted that the user may previously set the document sheets on the MFP 1 prior to inputting the scanning start instruction via the scan application 223, or may set the document sheets on the MFP 1 after the MFP 1 receives the scan job. Then, the MFP 1 transmits the scanned image data to the PC 2. Further, the MFP 1 transmits a total number of pages of the scanned image data to the PC 2 after completing image scanning of all the document sheets. Additionally, the MFP 1 transmits a completion notification to the PC 2 after completing the transmission of all pages of the scanned image data.

The scan application 223 displays a scan execution screen 70 as shown in FIG. 2C on the display 24 from when the MFP 1 starts scanning the document sheets until when the PC 2 completes the receipt of the scanned image data from the MFP 1. The scan execution screen 70 displays thereon a status dialog 71 indicating a progress of the image scanning The progress displayed in the status dialog 71 is updated based on the total number of pages received from the MFP 1 and a count of pages of image data already received from the MFP 1.

After the PC 2 completes the receipt of all pages of the scanned image data, the scan application 223 displays a scan result display screen 80 as shown in FIG. 2D on the display 24. The scan result display screen 80 includes an image display area 81, an inversion button 82, and a saving button 83. The image display area 81 displays each of images resulting from the image scanning on a page-by-page basis. The inversion button 82 is a button for applying black-white inversion to the individual images resulting from the image scanning. The saving button 83 is a button for saving, as image files, the individual images resulting from the image scanning.

The scan application 223 has a function to display a text area included in an image resulting from the image scanning in a black-white inverted manner. Suppose for instance that an image resulting from the image scanning includes a text area with a white background and black characters as shown in FIG. 3A. In such a case, when the inversion button 82 is operated, the scan application 223 performs black-white inversion. Thereby, as shown in FIG. 3B, the text area is displayed in such a manner that the background becomes black, and the characters become white. At this time, the scan application 223 also changes the background color of the menu and the setting screen from white to black. Thereafter, when the inversion button 82 is operated in the state where the base color is black as shown in FIG. 3B, the scan result display screen 80 is brought back into the state shown in FIG. 3A.

Further, the scan application 223 matches the background color of the menu and the setting screen to a color mode set in the OS 221, in an initial state before the inversion button 82 is operated. In other words, the OS 221 is capable of setting the color mode, and a setting value of the color mode is registered in the OS 221 as a color mode setting 222 (see FIG. 1). When launched, the scan application 223 makes an inquiry about the color mode setting 222 to the OS 221 and obtains the color mode setting 222. Then, the scan application 223 matches the background color of the menu and the setting screen to the obtained color mode.

Specifically, the OS 221 has a light mode and a dark mode as settable color modes. The light mode is a mode with a light color as the base color. When the color mode setting 222 represents the light mode, the scan application 223 sets the background color of the menu and the setting screen to white. FIGS. 2A to 2D shows examples of the screen images displayed when the light mode is set in the OS 221. On the other hand, the dark mode is a mode with a dark color as the base color. When the color mode setting 222 represents the dark mode, the scan application 223 sets the background color of the menu and the setting screen to black. FIG. 3B shows a state in which the inversion button 82 is operated while the scan result display screen 80 is displayed in the light mode. When the dark mode is set in the OS 221, as well, the background color of the menu and the setting screen is set to black in the same manner as shown in FIG. 3B. In other words, the operation of the inversion button 82 makes it possible to switch the color mode for the scan result display screen 80 displayed with the scan application 223 between the light mode and the dark mode.

When the inversion button 82 is operated, the scan application 223 switches the background color of the menu and the setting screen, as well as the base color of an image resulting from the image scanning, from one color to another. For instance, when the inversion button 82 is operated with the background color of the setting screen set to white as shown in FIG. 3A, the background color of the setting screen is switched to black as shown in FIG. 3B. Meanwhile, when the inversion button 82 is operated with the background color of the setting screen set to black, the background color of the setting screen is switched to white.

Figure 4:
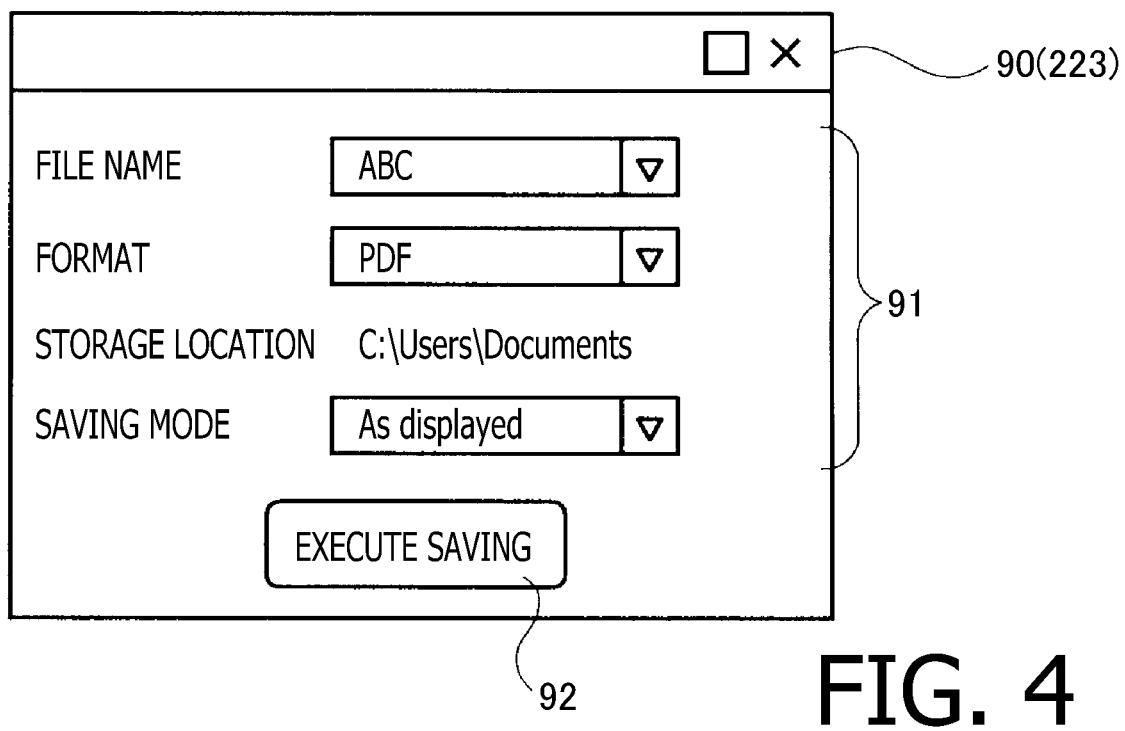
FIG. 4 shows an example of a saving setting screen to receive saving settings for saving the image resulting from the image scanning, in the illustrative embodiment according to one or more aspects of the present disclosure.

Further, the scan application 223 has a function to generate an image file from the scanned image data and save the generated image file. When the saving button 83 is operated, the scan application 223 displays on the scan result display screen 80 a saving setting screen 90 as shown in FIG. 4. The saving setting screen 90 includes saving setting item fields 91 for receiving saving settings, and a saving execution button 92. For instance, the saving setting items settable in the saving setting item fields 91 may include, but are not limited to, a file name, a file format, a storage location, and a saving mode. As the saving mode, one of "As displayed" and "As scanned" is selectable. Specifically, when "As displayed" is selected as the saving mode, the image being displayed in the image display area 81 is saved. Meanwhile, when "As scanned" is selected as the saving mode, the scanned image is saved. As described above, the scan application 223 is configured to apply the black-white inversion to the image displayed in the image display area 81. Hence, the image being displayed may be different from the scanned image. Thus, in the setting of the saving mode, a target image to be saved is selected from the settable options (i.e., "As displayed" and "As scanned"). The save execution button 92 is a button for inputting a saving execution instruction.

The storage location is not limited to the memory 22 of the PC 2. For instance, the storage location may be a storage server provided by a cloud service. Further, the storage location may be a mail address when the image file to be saved is sent as an attachment to an e-mail.

Subsequently, the processing by the CPU 21 executing the scan application 223 of the illustrative embodiment will be described in detail with respect to the following three separate processes. One of the processes is an image display process to cause the MFP 1 to scan document sheet(s) and cause the display 24 of the PC 2 to display image(s) resulting from the image scanning of the document sheet(s). Another process is a display inverting process to black-white invert an image being displayed on the display 24 of the PC 2. The other process is an image saving process to save the scanned image data. The image display process, the display inverting process, and the image saving process are performed by the CPU 21 of the PC 2.

Figure 5:
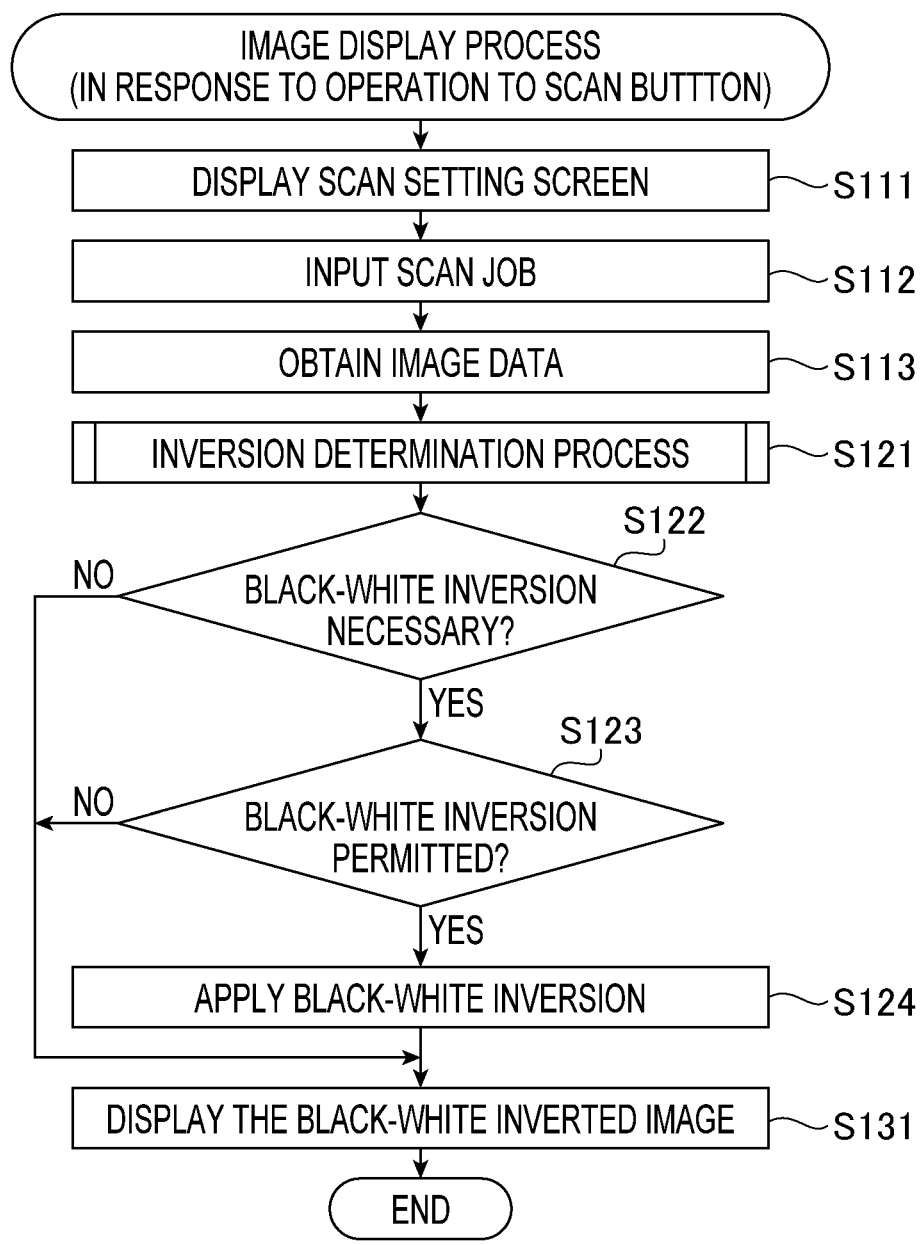
FIG. 5 is a flowchart showing a procedure of an image display process to be performed by the PC, in the illustrative embodiment according to one or more aspects of the present disclosure.

First, the image display process will be described with reference to a flowchart shown in FIG. 5. Each step of the flowchart represents a process to be basically performed by the CPU 21 according to a corresponding program instruction. The processing by the CPU 21 includes hardware control using an API of the OS 221. Hereinafter, in the present disclosure, operations according to program instructions will be described with no mention of the OS 221. The image display process begins to be performed by the CPU 21 in response to the scan button 52 being operated while the home screen 50 is displayed.

In the image display process, the CPU 21 first causes the display 24 to display the scan setting screen 60 (S111). Namely, the CPU 21 switches the screen displayed with the scan application 223 from the home screen 50 to the scan setting screen 60. Then, the CPU 21 receives various settings via the scan setting screen 60. For instance, the setting items settable via the scan setting screen 60 include the color setting as shown in FIG. 2B. Further, the CPU 21 receives an operation to the scan execution button 62.

When receiving the operation to the scan execution button 62, the CPU 21 inputs, into the OS 221, a scan job according to the various settings accepted via the scan setting screen 60 (S112). When the scan job is input into the OS 221, the scan job is transmitted from the PC 2 to the MFP 1. Then, the MFP 1 transmits image data resulting from image scanning according to the scan job.

Afterward, the PC 2 receives the image data from the MFP 1 via the communication I/F 25, thereby obtaining the received image data (S113). From completion of S112 until completion of S113, the CPU 21 causes the display 24 to display the scan execution screen 70, and updates the progress of the image scanning on the scan execution screen 70, for instance, each time the CPU 21 receives one page of image data from the MFP 1.

Figure 6:
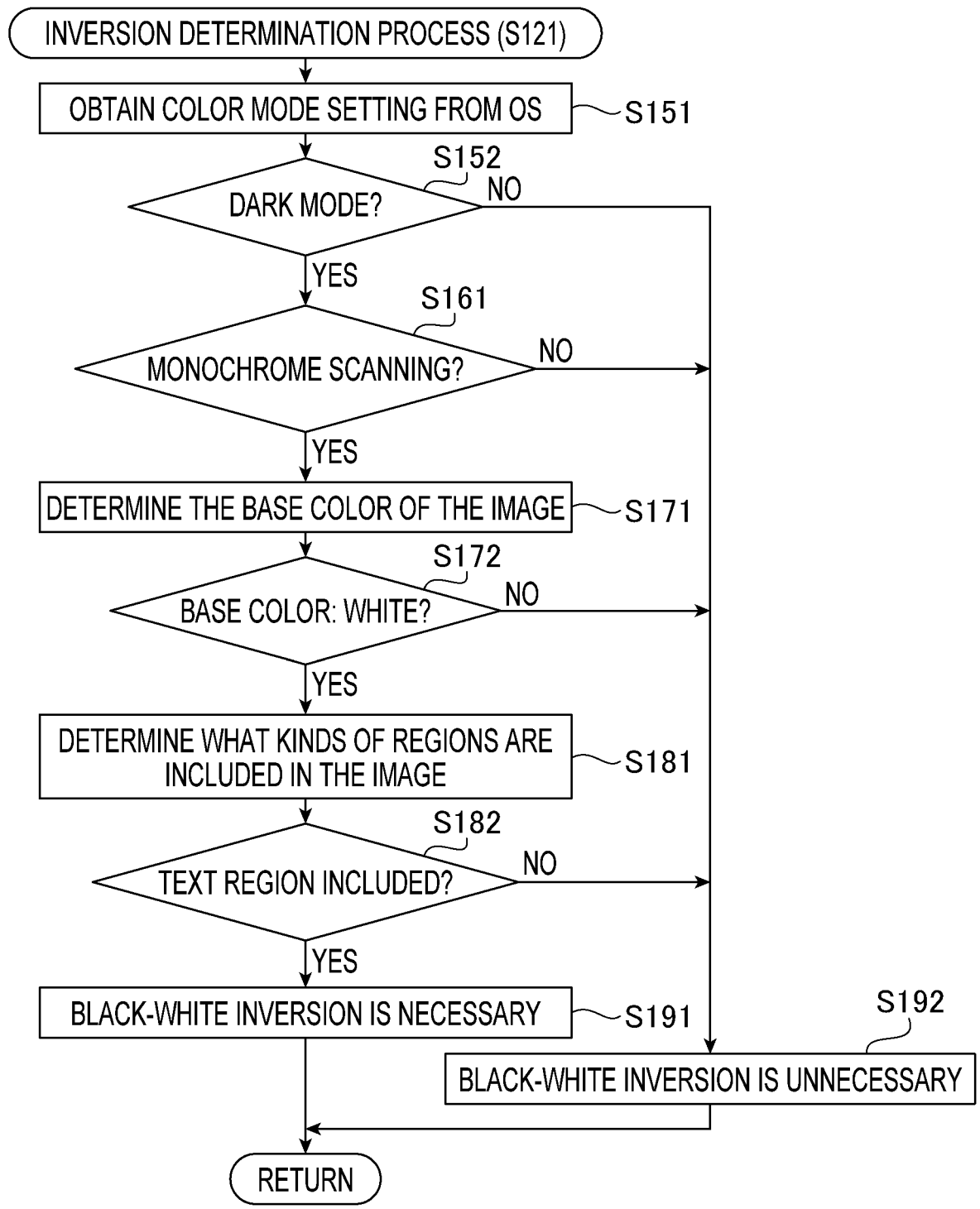
FIG. 6 is a flowchart showing a procedure of an inversion determination process to be performed by the PC, in the illustrative embodiment according to one or more aspects of the present disclosure.

After receiving the image data, the CPU 21 performs an inversion determination process to determine whether the black-white inversion is necessary to display an image represented by the obtained image data (S121). Here, the inversion determination process in S121 will be described in detail with reference to FIG. 6.

In the inversion determination process, the CPU 21 first makes an inquiry to the OS 221, thereby obtaining the color mode setting 222 from the OS 221 (S151). The timing to obtain the color mode setting 222 may be after the image data has been received, as exemplified in the illustrative embodiment. In other instances, the timing to obtain the color mode setting 222 may be immediately after the image display process has been started, or may be immediately after the scan application has been launched.

Then, the CPU 21 determines whether the obtained color mode setting 222 represents the dark mode (S152). When determining that the obtained color mode setting 222 does not represent the dark mode (S152: No), the CPU 21 determines that the black-white inversion is unnecessary (S192), and terminates the inversion determination process. In the light mode, the user is likely not to want the black-white inversion of the image resulting from the image scanning Therefore, when the obtained color mode setting 222 represents the light mode, it is determined that the black-white inversion is unnecessary.

Meanwhile, when determining that the obtained color mode setting 222 represents the dark mode (S152: Yes), the CPU 21 determines whether the color setting of the scan job represents an instruction to perform monochrome scanning (S161). When determining that the color setting of the scan job represents an instruction to perform color scanning (S161: No), the CPU 21 determines that the black-white inversion is unnecessary (S192), and terminates the inversion determination process. If the image resulting from the color scanning is black-white inverted, the inverted image is highly likely to be more difficult to visually recognize. Therefore, when the color setting of the scan job represents an instruction to perform the color scanning, it is determined that the black-white inversion is unnecessary.

Meanwhile, when determining that the color setting of the scan job represents an instruction to perform monochrome scanning (S161: Yes), the CPU 21 analyzes the obtained image data to determine the base color the image represented by the obtained image data (S171). For instance, the CPU 21 calculates an average brightness of all pixels. Then, when the calculated average brightness is lower than a particular value, the CPU 21 determines that the base color of the image represented by the obtained image data is black. Meanwhile, when the calculated average brightness is equal to or higher than the particular value, the CPU 21 determines that the base color of the image represented by the obtained image data is white. Then, the CPU 21 determines whether the base color of the image is white (S172). When determining that the base color of the image is black (S172: No), the CPU 21 determines that the black-white inversion is unnecessary (S192), and terminates the inversion determination process. When the base color of the image is black, it suits the preference of the user who has set the dark mode. Therefore, in this case, it is determined that the black-white inversion is unnecessary.

Meanwhile, when determining that the base color of the image is white (S172: Yes), the CPU 21 further analyzes the obtained image data to determine what kinds of regions are included in the image (S181). Specifically, in S181, from the image represented by the obtained image data, the CPU 21 attempts to extract a text region including text and a photograph region including a photographic image. Then, the CPU 21 determines whether the image represented by the obtained image data includes a text region (S182). When determining that the image does not include a text region (S182: No), the CPU 21 determines that the black-white inversion is unnecessary (S192), and terminates the inversion determination process. If the image including not a text region but other regions is black-white inverted, the inverted image may be more difficult to visually recognize. Therefore, when the image does not include a text region, it is determined that black-white inversion is unnecessary.

Meanwhile, when determining that the image represented by the obtained image data includes a text region (S182: Yes), the CPU 21 determines that the black-white inversion is necessary (S191), and terminates the inversion determination process. Namely, the CPU determines that the black-white inversion is necessary, when the dark mode is set in the OS 221, the MFP 1 has been caused to perform the monochrome scanning, the base color of the image represented by the obtained image data is white, and the image represented by the obtained image data includes a text region. It is noted that an order of the determination steps S152, S161, S172, and S182 may not necessarily be limited to the order shown in FIG. 6.

Referring back to FIG. 5, the CPU 21 determines whether the black-white inversion is determined to be necessary in the inversion determination process of S121 (S122). When determining that the black-white inversion is determined to be necessary (S122: Yes), the CPU 21 causes the display 24 to display a dialog for receiving an operation indicating whether to permit the black-white inversion to the image, and receives a user operation via the dialog. Then, the CPU 21 determines whether a permission for the black-white inversion has been input (S123).

When determining that the permission for the black-white inversion has been input (S123: Yes), the CPU 21 applies the black-white inversion to regions other than the photograph region in the image represented by the obtained image data (S124). If a photographic image is black-white inverted, the inverted image may give the user a sense of discomfort. Therefore, the black-white inversion is not applied to the photograph region. Then, the CPU 21 causes the display 24 to display the scan result display screen 80 and further display the black-white inverted image in the image display area 81 (S131). After S131, the CPU 21 terminates the image display process.

On the other hand, when determining that the black-white inversion is determined to be unnecessary (S122: No), the CPU 21 causes the display 24 to display the scan result display screen 80 and further display the image represented by the obtained image data in the image display area 81, without applying the black-white inversion to the image (S131). Further, when determining that the permission for the black-white inversion has not been input (S123: No), the CPU 21 puts a priority on the user's intention, and causes the display 24 to display the scan result display screen 80 and display the image represented by the obtained image data in the image display area 81, without applying the black-white inversion to the image (S131). After S131, the CPU 21 terminates the image display process.

Namely, according to the image display process of the illustrative embodiment, the image resulting from the image scanning is displayed in the image display area 81. For instance, if the base color of the image on the document sheet to be scanned is white, normally, an image with a white base color is displayed in the image display area 81 as shown in FIG. 3A.

However, when it is determined in the inversion determination process of S121 that the black-white inversion is necessary, more specifically, all the requirements in the steps S152, S161, S172, and S182 are satisfied, even if the base color of the image on the document sheet to be scanned is white, an image with a black base color is displayed in the image display area 81 as shown in FIG. 3B, after the black-white inversion is applied to the image resulting from the image scanning Consequently, as well as the background color of the menu and the setting screen of the scan application 223, the image resulting from the image scanning is displayed in a manner matched to the color mode set in the OS 221.

Figure 7:
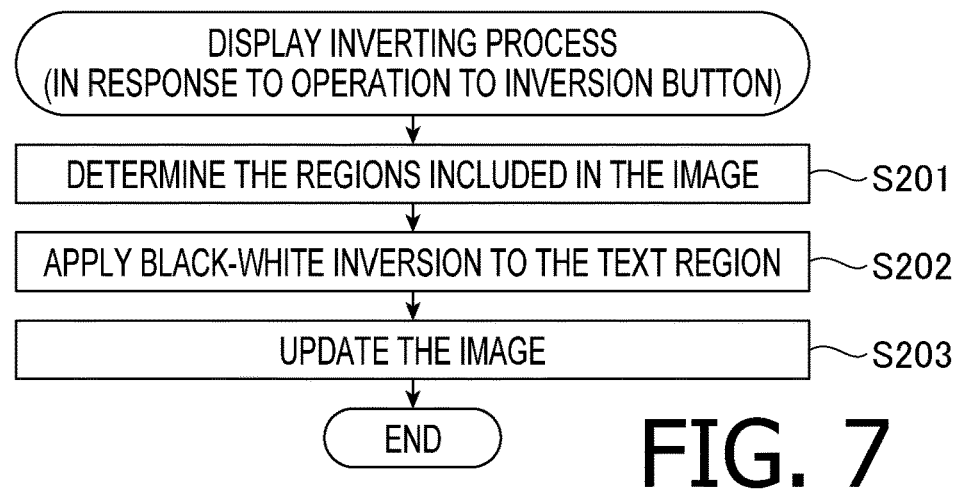
FIG. 7 is a flowchart showing a procedure of a display inverting process to be performed by the PC, in the illustrative embodiment according to one or more aspects of the present disclosure.

Subsequently, the display inverting process will be described with reference to FIG. 7. The display inverting process is performed by the CPU 21 in response to the inversion button 82 being operated while the scan result display screen 80 is displayed. The black-white inversion in response to the operation to the inversion button 82 is performed regardless of the color mode setting 222 in the OS 221.

In the display inverting process, the CPU 21 first analyzes the image being displayed to determine the regions included in the image (S201). It is noted that when the image has already been analyzed in S181 of the aforementioned inversion determination process in the aforementioned image display process, and the analysis results have been stored, execution of S201 may be omitted.

After S201, the CPU 21 applies the black-white inversion to the text region of the image being displayed (S202). The black-white inversion in the display inverting process is performed in response to an explicit instruction issued by a user operation of the inversion button 82. Therefore, the acceptance of the permission for the black-white inversion may be omitted.

After S202, the CPU 21 displays the black-white inverted image in the image display area 81, thereby updating the image displayed in the image display area 81 (S203). Further, in S203, the CPU 21 switches the background color of the menu and the setting screen of the scan application 223 from one color to another. After S203, the CPU 21 terminates the display inverting process.

Figure 8:
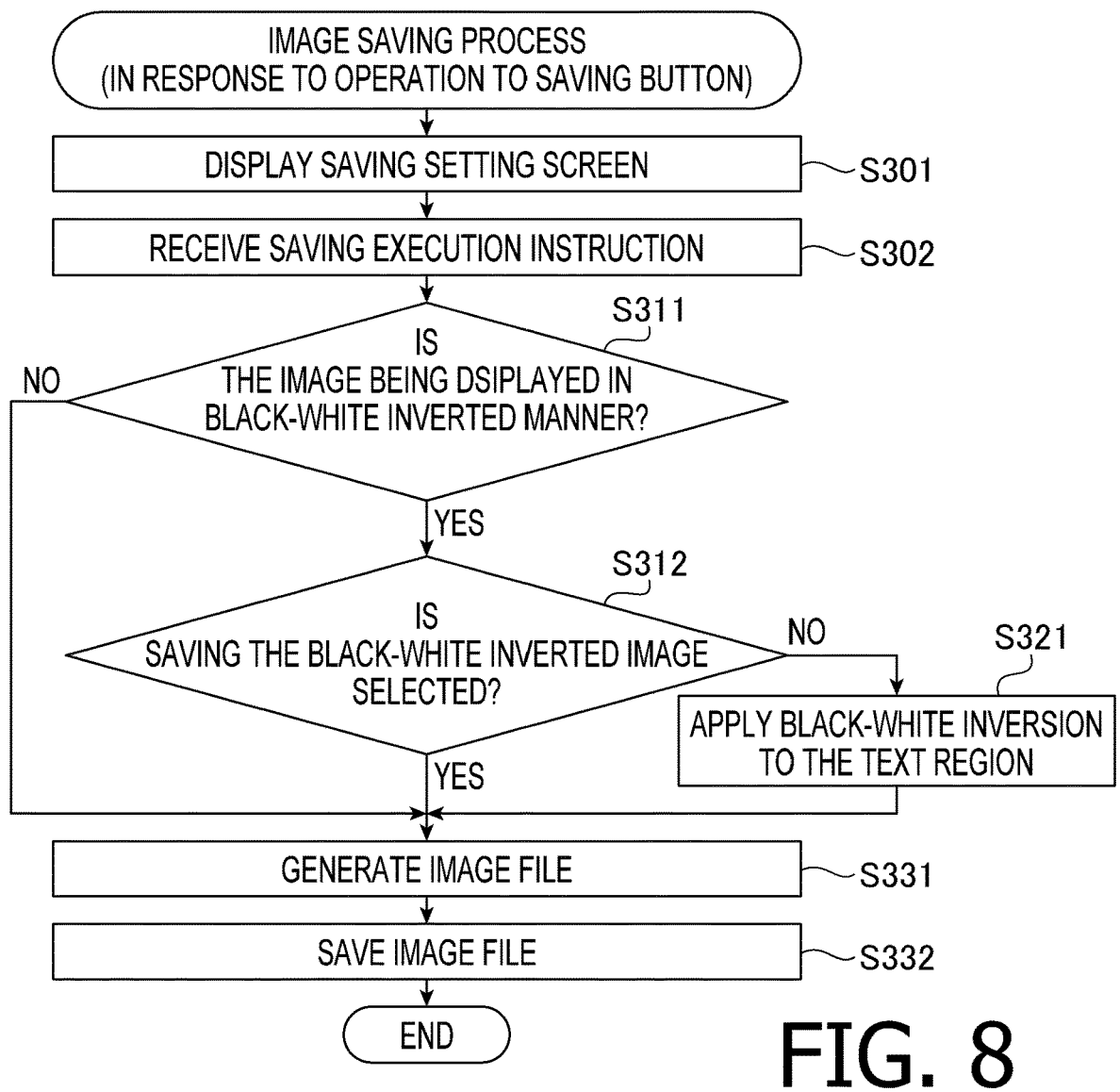
FIG. 8 is a flowchart showing a procedure of an image saving process to be performed by the PC, in the illustrative embodiment according to one or more aspects of the present disclosure.

Subsequently, the image saving process will be described with reference to FIG. 8. The image saving process is performed by the CPU 21 in response to the saving button 83 being operated while the scan result display screen 80 is displayed.

In the image saving process, the CPU 21 first displays, on the display 24, the saving setting screen 90 to be superimposed on the scan result display screen 80 (S301). Then, the CPU 21 receives various settings via the saving setting screen 90. Further, the CPU 21 receives a saving execution instruction input in response to the saving execution button 92 being operated (S302). When receiving the saving execution instruction, the CPU 21 obtains the settings configured on the saving setting screen 90.

Further, after receiving the saving execution instruction, the CPU 21 determines whether the image represented by the image data obtained from the MFP 1 is being displayed in a black-white inverted manner on the scan result display screen 80 (S311).

When determining that the image represented by the obtained image data is being displayed in a black-white inverted manner (S311: Yes), the CPU 21 determines whether "As displayed" is selected as the saving mode on the saving setting screen 90, i.e., whether saving the black-white inverted image is selected (S312). When determining that saving the black-white inverted image is selected (S312: Yes), the CPU 21 generates an image file for storing the image being displayed in a black-white inverted manner, with a file name and in a file format as specified via the saving setting screen 90 (S331).

Meanwhile, when determining that saving the black-white inverted image is not selected (S312: No), i.e., that saving the scanned image is selected, the CPU 21 applies the black-white inversion to the text region of the image being displayed (S321). Then, the CPU 21 restores the image being displayed to the image represented by the scanned image data, and generates an image file for storing the restored image, with the file name and in the file format as specified via the saving setting screen 90 (S331). If the image represented by the scanned image data is separately stored while the black-white inverted image is displayed, the CPU 21 may generate an image file based on the stored image data, without executing S321.

Meanwhile, when determining that the image represented by the obtained image data is not being displayed in a black-white inverted manner (S311: No), i.e., that the image represented by the obtained image data is displayed as is, the CPU 21 generates an image file for storing the image being displayed without being black-white inverted, with a file name and in a file format as specified via the saving setting screen 90 (S331).

After S331, the CPU 21 saves the image file generated in S331 into a storage location specified via the saving setting screen 90 (S332). After S332, the CPU 21 terminates the image saving process. Thereby, it is possible to save the image represented by the image data obtained from the MFP 1 in the user's desired saving mode regardless of whether the image is displayed in a black-white inverted manner.

As described in detail above, the scan application 223 of the illustrative embodiment causes the display 24 to display the image represented by the image data obtained from the MFP 1 in a black-white inverted manner, when the MFP 1 has been caused to perform monochrome scanning, the dark mode is set as the color mode in the OS 221, and the image resulting from the monochrome scanning includes a text region. In other words, when the MFP 1 is instructed to perform the monochrome scanning with the dark mode being set as the color mode in the OS 221, and the image resulting from the monochrome scanning includes a text region, the image resulting from the monochrome scanning is not displayed as is, but is displayed in a black-white inverted manner to be matched to the color mode set in the OS 221. The text region is highly likely to contain a dark-colored text on a light-colored background. In such a case, when the black-white inversion is applied to the text region, the text region is displayed with a light-colored text on a dark-colored background. Thereby, it is possible to display the image resulting from the image scanning in such a manner that the effects of the dark mode are reflected in the displayed image.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications according to aspects of the present disclosure are feasible.

An image scanning apparatus according to aspects of the present disclosure is not limited to an MFP, but may be any type of apparatus having an image scanning function, or may be an apparatus exclusively for image scanning such as an image scanner. In addition, an information processing device according to aspects of the present disclosure, which is configured to accept input of a scan job and transmit the scan job to the image scanning apparatus, is not limited to a PC but may be a mobile device such as a smartphone.

In the aforementioned illustrative embodiment, the background color of the setting screen is switched as well as the base color of an image resulting from image scanning, to be matched to the color mode setting 222 in the OS 221. However, the background color of the setting screen may not be switched. Further, in the aforementioned illustrative embodiment, when the inversion button 82 is operated, the background color of the setting screen is switched as well as the base color of the image resulting from the image scanning. However, the background color of the setting screen may not be switched.

In the aforementioned illustrative embodiment, the black-white inversion is not applied to a photograph region of the image. However, the black-white inversion may be applied to the photograph region of the image. In another instance, the scan application 223 may accept a setting as to whether to apply the black-white inversion to the photograph region, and may execute processing according to the accepted setting.

In the aforementioned illustrative embodiment, when the image resulting from image scanning of a document sheet is a black-based image (i.e., an image with black as the base color), it is determined that the black-white inversion is unnecessary. However, even when the image resulting from the image scanning is a black-based image, the black-white inversion may be applied to the image. In this case, the processes of S171 and S172 (see FIG. 6) should be omitted. In another instance, the scan application 223 may accept a setting as to whether to apply the black-white inversion to a black-based image, and may execute processing according to the accepted setting. However, when the black-white inversion is applied to a black-based image, the black-white inverted image is displayed to be a white-based image, and the effects of the dark mode are not reflected in the displayed image. Therefore, it is preferable not to apply the black-white inversion to a black-based image, as exemplified in the aforementioned illustrative embodiment.

In the aforementioned illustrative embodiment, when the dark mode is set as the color mode in the OS 221, it is determined that the black-white inversion is necessary. However, even when the light mode is set as the color mode in the OS 221, the black-white inversion may be performed. For instance, when the light mode is set as the color mode in the OS 221, and the image resulting from image scanning of a document sheet is a black-based image, a white-based image, which is obtained by the black-white inversion to the black-based image, may be easy to visually recognize. In such a case, the black-white inversion should be performed. In another instance, the scan application 223 may accept a setting as to whether to apply the black-white inversion to the white-based image, and may execute processing according to the accepted setting.

In the aforementioned illustrative embodiment, when it is determined in S121 that the black-white inversion is necessary, the user is provided with an inquiry about whether to actually perform the black-white inversion. However, S121 may be omitted. In another instance, the scan application 223 may accept a setting as to whether to restrict the black-white inversion via the scan setting screen 60, and may execute processing according to the accepted setting. Namely, when a setting to restrict the black-white inversion is accepted via the scan setting screen 60, even though it is determined in S121 that the black-white inversion is necessary, the black-white inversion may be restricted from being performed.

In the aforementioned illustrative embodiment, when a black-white inverted image is being displayed, a target image to be saved is determined according to the saving mode that is previously set via the saving setting screen 90. However, the saving setting screen 90 may not include a field for setting the saving mode. In this case, after it is determined in S311 that the black-white inverted image is being displayed, the scan application 223 may cause the display 24 to display a dialog for selecting a saving mode, and may accept a user's selection via the dialog.

In the aforementioned illustrative embodiment, it is possible to determine whether the target image to be saved is the image being displayed or the scanned image, by accepting via the saving setting screen 90 a selection from the settable values (i.e., "As displayed" and "As scanned") for the saving mode. However, only one of the values may be settable as the saving mode. Namely, whenever the saving execution button 92 is operated while a black-white inverted image is displayed in the image display area 81 on the scan result display screen 80, the black-white inverted image being displayed may be saved, or the scanned image before being black-white inverted may be saved. For instance, in a case where an image file of the black-white inverted image is saved, the black-white inverted image is displayed when the saved image file has been read out again. In this case, the effects of the dark mode are reflected in the displayed image. On the other hand, in a case where an image file of the scanned image is saved as is without being black-white inverted, even when the saved image file is read out by another user, it is possible to avoid dissatisfaction that the said another user may show when knowing that the image file is different from the image of the document sheet.

In the aforementioned illustrative embodiment, the scan result display screen 80 includes the inversion button 82, and the image being displayed on the scan result display screen 80 is unconditionally black-white inverted in response to an operation to the inversion button 82. However, for instance, the inversion button 82 may be operable when it is determined in S121 that the black-white inversion is necessary. Further, the inversion button 82 may be restricted from being operated when it is determined in S121 that the black-white inversion is unnecessary. In this case, to restrict the inversion button 82 from being operated, the inversion button 82 may be hidden, or may be displayed but inoperable. Namely, when an image different from the image resulting from the image scanning is displayed, manual black-white inversion may be permitted to be applied to the image being displayed.

Further, in any flowchart described in the aforementioned illustrative embodiment, a plurality of processes in any plurality of steps may be arbitrarily changed in an execution order or may be performed in parallel, as long as there is no inconsistency in processing results.

Further, the processes described in the aforementioned illustrative embodiment may be performed by one or more CPUs, one or more hardware elements such as ASICs, or a combination of at least two of the one or more CPUs and the one or more hardware elements. Further, the processes described in the aforementioned illustrative embodiment may be achieved in various forms such as storage media storing programs for performing the processes and methods for performing the processes.

In the aforementioned illustrative embodiment, the scan application 223 configured to display an image resulting from image scanning by the MFP 1 has been described. However, the technologies of the present disclosure need not be specific about a source of the image data and/or how to obtain the image data, and may be extensively applied to various technical aspects other than the scan application 223. For instance, the technologies of the present disclosure may be applied to an application program to download and display content images stored in an external server. In this case, the application program may be configured to, when executed by a computer, cause the computer to download and obtain image data from the external server, determine whether an image represented by the obtained image data includes a text, and obtain base color information representing whether black is set as a base color in an OS of the computer. Then, when the obtained image is monochrome image, it is determined that the image represented by the obtained image includes a text, and the obtained base color information represents that black is set as the base color, the application program may cause the computer to apply the black-white inversion to the image represented by the obtained image data and display the black-white inverted image. In this case as well, the effects of the setting of black as the base color are reflected in the displayed image and provided to the user.

The following shows examples of associations between elements exemplified in the aforementioned illustrative embodiment and modifications and elements according to aspects of the present disclosure. The MFP 1 may be an example of "an image scanner" according to aspects of the present disclosure. The PC 2 may be an example of "an information processing device" according to aspects of the present disclosure. The controller 20 may be an example of "a controller" according to aspects of the present disclosure. The CPU 21 may be an example of "a processor" according to aspects of the present disclosure. The memory 22 may be an example of "a non-transitory computer-readable medium" according to aspects of the present disclosure, and may be an example of "a memory" according to aspects of the present disclosure. The input device 23 may be an example of "a user interface" according to aspects of the present disclosure. The communication I/F 25 may be an example of "a communication interface" according to aspects of the present disclosure. The display 24 may be an example of "a display" according to aspects of the present disclosure. The scan application 223 may be an example of "computer-readable program instructions" according to aspects of the present disclosure. The OS 221 may be an example of "an OS" according to aspects of the present disclosure. The color mode setting 222 may be an example of "base color information" according to aspects of the present disclosure.

What is claimed is:

1. A non-transitory computer-readable medium storing computer-readable program instructions executable by a processor of an information processing device communicable with an image scanner, the program instructions being configured to, when executed by the processor, cause the information processing device to:
    receive a scan instruction to cause the image scanner to perform image scanning of a document sheet, via a user interface of the information processing device, the scan instruction including a scan setting indicating whether to perform monochrome scanning or color scanning;
    receive image data generated by the image scanning of the document sheet according to the scan instruction, from the image scanner via a communication interface of the information processing device;
    obtain base color information representing whether black is set as a base color in an OS incorporated in the information processing device;
    determine whether an image represented by the received image data includes a text; and
    apply black-white inversion to the image represented by the received image data, and display the black-white inverted image on a display of the information processing device, when the scan instruction includes the scan setting indicating to perform the monochrome scanning, the obtained base color information represents that black is set as the base color in the OS, and it is determined that the image represented by the received image data includes a text.

2. The non-transitory computer-readable medium according to claim 1,
    wherein the program instructions are further configured to, when executed, cause the information processing device to:
        specify a photograph region included in the image represented by the received image data; and
        apply the black-white inversion to a region other than the specified photograph region included in the image represented by the received image data.

3. The non-transitory computer-readable medium according to claim 1,
    wherein the program instructions are further configured to, when executed, cause the information processing device to:
        determine whether a base color of the image represented by the received image data is black; and
        not apply the black-white inversion to the image represented by the received image data, when determining that the base color of the image represented by the received image data is black.

4. The non-transitory computer-readable medium according to claim 1,
    wherein the program instructions are further configured to, when executed, cause the information processing device to:
        make an inquiry about whether to permit the black-white inversion to the image represented by the received image data, via the user interface;
        determine whether a permission for the black-white inversion to the image represented by the received image data has been received via the user interface in response to the inquiry; and
        not apply the black-white inversion to the image represented by the received image data, when determining that the permission has not been received via the user interface.

5. The non-transitory computer-readable medium according to claim 4,
    wherein the program instructions are further configured to, when executed, cause the information processing device to:
        make the inquiry about whether to permit the black-white inversion to the image represented by the received image data, via the user interface, when the scan instruction includes the scan setting indicating to perform the monochrome scanning, the obtained base color information represents that black is set as the base color in the OS, and it is determined that the image represented by the received image data includes a text.

6. The non-transitory computer-readable medium according to claim 1,
    wherein the program instructions are further configured to, when executed, cause the information processing device to:
        when receiving an image saving instruction via the user interface while the black-white inverted image is being displayed on the display, generate an image file for storing the black-white inverted image, and store the generated image file into a memory.

7. The non-transitory computer-readable medium according to claim 1,
    wherein the program instructions are further configured to, when executed, cause the information processing device to:
        when receiving an image saving instruction via the user interface while the black-white inverted image is being displayed on the display, generate an image file for storing the image represented by the received image data without being black-white inverted, and store the generated image file into a memory.

8. The non-transitory computer-readable medium according to claim 1,
    wherein the program instructions are further configured to, when executed, cause the information processing device to:
        receive via the user interface a saving setting indicating whether to save the black-white inverted image;

determine whether the received saving setting indicates to save the black-white inverted image, when receiving an image saving instruction via the user interface while the black-white inverted image is being displayed on the display;

when determining that the received saving setting indicates to save the black-white inverted image, generate an image file for storing the black-white inverted image, and store the generated image file into a memory; and when determining that the received saving setting does not indicate to save the black-white inverted image, generate an image file for storing the image represented by the received image data without being black-white inverted, and store the generated image file into the memory.

9. An information processing device comprising:
a user interface;
a communication interface;
a display; and
a controller configured to:
receive via the user interface a scan instruction to cause an image scanner to perform image scanning of a document sheet, the scan instruction including a scan setting indicating whether to perform monochrome scanning or color scanning;
receive image data generated by the image scanning of the document sheet according to the scan instruction, from the image scanner via the communication interface;
obtain base color information representing whether black is set as a base color in an OS incorporated in the information processing device;
determine whether an image represented by the received image data includes a text; and
apply black-white inversion to the image represented by the received image data, and display the black-white inverted image on the display, when the scan instruction includes the scan setting indicating to perform the monochrome scanning, the obtained base color information represents that black is set as the base color in the OS, and it is determined that the image represented by the received image data includes a text.

10. The information processing device according to claim 9,
wherein the controller is further configured to:
specify a photograph region included in the image represented by the received image data; and
apply the black-white inversion to a region other than the specified photograph region included in the image represented by the received image data.

11. The information processing device according to claim 9,
wherein the controller is further configured to:
determine whether a base color of the image represented by the received image data is black; and
not apply the black-white inversion to the image represented by the received image data, when determining that the base color of the image represented by the received image data is black.

12. The information processing device according to claim 9,
wherein the controller is further configured to:
make an inquiry about whether to permit the black-white inversion to the image represented by the received image data, via the user interface;
determine whether a permission for the black-white inversion to the image represented by the received image data has been received via the user interface in response to the inquiry; and
not apply the black-white inversion to the image represented by the received image data, when determining that the permission has not been received via the user interface.

13. The information processing device according to claim 12,
wherein the controller is further configured to:
make the inquiry about whether to permit the black-white inversion to the image represented by the received image data, via the user interface, when the scan instruction includes the scan setting indicating to perform the monochrome scanning, the obtained base color information represents that black is set as the base color in the OS, and it is determined that the image represented by the received image data includes a text.

14. The information processing device according to claim 9,
wherein the controller is further configured to:
when receiving an image saving instruction via the user interface while the black-white inverted image is being displayed on the display, generate an image file for storing the black-white inverted image, and store the generated image file into a memory.

15. The information processing device according to claim 9,
wherein the controller is further configured to:
when receiving an image saving instruction via the user interface while the black-white inverted image is being displayed on the display, generate an image file for storing the image represented by the received image data without being black-white inverted, and store the generated image file into a memory.

16. The information processing device according to claim 9,
wherein the controller is further configured to:
receive via the user interface a saving setting indicating whether to save the black-white inverted image;
determine whether the received saving setting indicates to save the black-white inverted image, when receiving an image saving instruction via the user interface while the black-white inverted image is being displayed on the display;
when determining that the received saving setting indicates to save the black-white inverted image, generate an image file for storing the black-white inverted image, and store the generated image file into a memory; and
when determining that the received saving setting does not indicate to save the black-white inverted image, generate an image file for storing the image represented by the received image data without being black-white inverted, and store the generated image file into the memory.

17. The information processing device according to claim 9,
wherein the controller comprises:
a processor; and
a memory storing computer-readable program instructions configured to, when executed by the processor, cause the controller to:
receive the scan instruction via the user interface;

receive the image data generated by the image scanning of the document sheet according to the scan instruction, from the image scanner via the communication interface;

obtain the base color information;

determine whether the image represented by the received image data includes a text; and apply the black-white inversion to the image represented by the received image data, and display the black-white inverted image on the display, when the scan instruction includes the scan setting indicating to perform the monochrome scanning, the obtained base color information represents that black is set as the base color in the OS, and it is determined that the image represented by the received image data includes a text.

18. A method implementable on a processor of an information processing device communicable with an image scanner, the method comprising:

receiving a scan instruction to cause the image scanner to perform image scanning of a document sheet, via a user interface of the information processing device, the scan instruction including a scan setting indicating whether to perform monochrome scanning or color scanning;

receiving image data generated by the image scanning of the document sheet according to the scan instruction, from the image scanner via a communication interface of the information processing device;

obtaining base color information representing whether black is set as a base color in an OS incorporated in the information processing device;

determining whether an image represented by the received image data includes a text; and applying black-white inversion to the image represented by the received image data, and displaying the black-white inverted image on a display of the information processing device, when the scan instruction includes the scan setting indicating to perform the monochrome scanning, the obtained base color information represents that black is set as the base color in the OS, and it is determined that the image represented by the received image data includes a text.

\* \* \* \* \*